United States Patent
Johnston et al.

(10) Patent No.: US 7,650,750 B2
(45) Date of Patent: Jan. 26, 2010

(54) DOMESTIC COMBINED HEAT AND POWER ASSEMBLY

(75) Inventors: David Johnston, Lawrenceville, NJ (US); John Coppendale, Stapleford (GB)

(73) Assignee: Microgen Engine Corporation Holding B.V., ULFT (NL)

( * ) Notice: Subject to any disclaimer, the term of this patent is extended or adjusted under 35 U.S.C. 154(b) by 457 days.

(21) Appl. No.: 10/556,412

(22) PCT Filed: May 13, 2004

(86) PCT No.: PCT/GB2004/002075

§ 371 (c)(1),
(2), (4) Date: Jan. 23, 2006

(87) PCT Pub. No.: WO2004/101982

PCT Pub. Date: Nov. 25, 2004

(65) Prior Publication Data

US 2007/0028611 A1 Feb. 8, 2007

(30) Foreign Application Priority Data

May 13, 2003 (GB) ................................. 0310999.8

(51) Int. Cl.
*F01B 29/10* (2006.01)

(52) U.S. Cl. ........................................................ 60/517
(58) Field of Classification Search ............ 60/517–526
See application file for complete search history.

(56) References Cited

U.S. PATENT DOCUMENTS

| 3,937,017 | A | 2/1976 | Beschorner et al. ........... 60/516 |
| 5,743,091 | A | 4/1998 | Penswick et al. ............. 60/517 |
| 6,263,671 | B1 | 7/2001 | Bliesner ..................... 60/517 |
| 6,983,593 | B2 * | 1/2006 | Gregory et al. .............. 60/517 |
| 7,021,054 | B2 * | 4/2006 | Alderson et al. ............. 60/517 |
| 2002/0005043 | A1 * | 1/2002 | Rudick et al. .................... 62/6 |
| 2002/0088237 | A1 * | 7/2002 | Rudick et al. .................... 62/6 |

FOREIGN PATENT DOCUMENTS

| DE | 199 36 591 | 2/2001 |
| WO | WO 01/90656 | 11/2001 |

* cited by examiner

*Primary Examiner*—Hoang M Nguyen
(74) *Attorney, Agent, or Firm*—Ballard Spahr LLP (57) ABSTRACT

A domestic combined heat and power assembly comprising a wall mountable frame (13), a Stirling engine module (40) with a Stirling engine (41), and a heat exchanger module (20) for the recovery of heat from the Stirling engine. The Stirling engine module and the heat exchanger module are separate units which are mountable to the frame independently of one another.

8 Claims, 8 Drawing Sheets

DOMESTIC COMBINED HEAT AND POWER ASSEMBLY

CROSS REFERENCE TO RELATED APPLICATIONS

The present application claims priority to Great Britain Patent Application No. 0310999.8, filed May 13, 2003, which application is incorporated herein fully by this reference.

The present invention relates to a domestic combined heat and power (dchp) system, and, in particular, one which uses a Stirling engine for the generation of electrical power and which is also arranged to provide heat energy.

Such an engine requires a considerable amount of peripheral equipment to operate, including, for example, a heat exchanger for the recovery of heat from the Stirling engine.

Ideally, the entire appliance would be assembled as a single unit, which would then be transported to its final location for installation. Due to the weight involved this installation procedure will present a hazard and necessitate the presence of more than one skilled engineer.

According to the present invention there is provided a domestic combined heat and power assembly comprising a wall mountable frame; a Stirling engine module comprising a Stirling engine for the generation of electrical power and which is also arranged to provide heat energy; and a heat exchanger module for the recovery of heat from the Stirling engine; wherein the Stirling engine module and the heat exchange module are separate units, and wherein the Stirling engine module is mountable to the frame independently of the heat exchanger module.

By designing the assembly with a Stirling engine module which is mountable independently of the heat exchanger module, the weight of the component parts of the appliance to be lifted into position is reduced allowing a single engineer to carry out the installation. A further benefit is that if there is a failure of the Stirling engine unit, the units can simply be removed and replaced involving minimal disruption to a consumer. The damaged unit could then be serviced off-site.

The Stirling engine module may be attached to the frame by any convenient mounting arrangement. However, preferably, the frame has a bracket arranged to receive the engine in a first position from which it is pivotably moveable about the bracket to a second operating position in which it is permanently supported by the frame. Such a mounting provides a convenient way of allowing the head of the engine to be swung up into the heat exchanger module.

Both the heat exchanger and Stirling engine modules can comprise a number of additional components. For example, the Stirling engine module preferably comprises a resiliently mounted absorber mass, a combustion seal, the engine suspension assembly, and pipes for the supply of water to and from an engine cooler. Alternatively, one or more of these components may be mounted elsewhere on the assembly. The heat exchanger module preferably comprises a burner for the supply of hot combustion gases to the Stirling engine head, a supplementary burner for the generation of additional heat, a gas train for the supply of combustible gas to the or each burner, an exhaust duct for the removal of exhaust gases from the or each burner, and water pipes for water to be heated by the or each burner. Again, one or more of these components may be provided elsewhere on the assembly.

The modular design of the unit can be extended to other aspects of the assembly, such that the assembly preferably comprises a control module comprising a system controller and which is mountable to the frame independently of the Stirling engine and heat exchanger modules. Again, this provides advantages of reducing the individual weight of the transported components and of ease of maintenance.

The assembly may also be provided with a combi module which is mountable to the assembly independently of any other modules and which is arranged to supply an instant domestic demand for hot water in addition to central heating. Such a module can be provided if the user requires the dchp system to fulfil the function of a convention combi boiler.

The combi module may simply comprise an additional heat exchanger which will heat domestic hot water on demand. However, preferably, the combi module comprises a hot water tank, and the assembly further comprises control means to maintain the temperature of the water in the tank at an elevated temperature at times of likely hot water demand. The tank is designed to be relatively small (of the order of 12 liters capacity), and simply allows the assembly to supply the hot water demand as quickly as possible while the engine burner or supplementary burner are fired up to supply a continued demand for hot water beyond the capacity of the tank.

Our current design of dchp systems incorporates a structural sub-frame which is mounted to the wall, and on which all of the system components are mounted. This sub-frame and the system components are then surrounded by a separate two-part room sealed box which prevents the transmission of noise and vibration from the engine and its components to the surrounding room.

According to a second aspect of the present invention there is provided a domestic combined heat and power unit comprising a sealed housing, means for mounting the sealed housing to a wall; a Stirling engine; a burner for heating the head of the Stirling engine; and a heat exchanger for recovering exhaust heat from the head of the Stirling engine, wherein the Stirling engine, burner and heat exchanger are supported directly by the sealed housing.

By supporting the elements of the Stirling engine system through the sealed housing which also serves to provide the seal to the external environment, the design of the unit can be simplified, thereby reducing the complexity and weight of the unit and hence the manufacturing cost.

An example of the assembly constructed in accordance with the present invention will now be described with reference to the accompanying drawings, in which.

Figure 1:
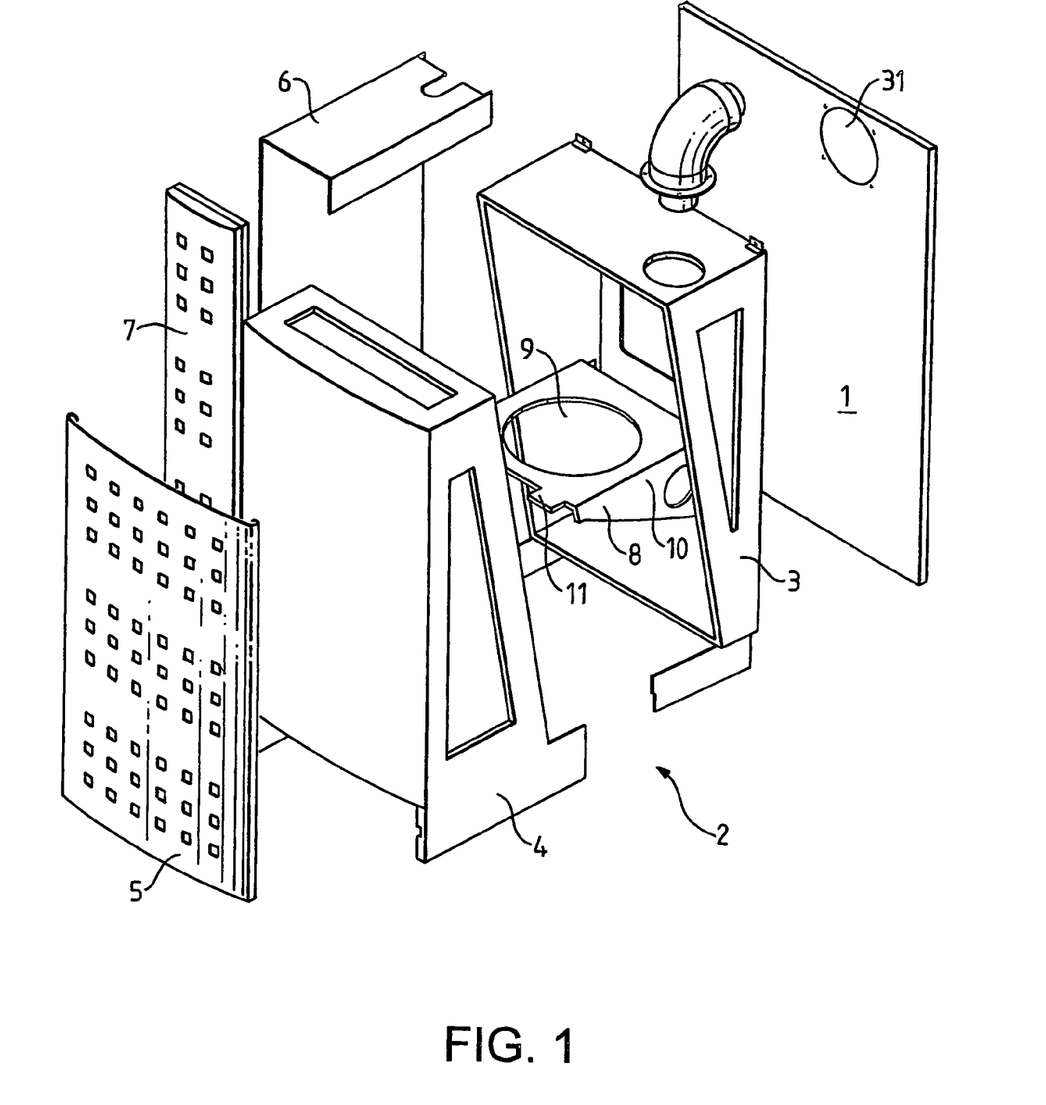
FIG. 1 is an exploded schematic sectional view of the covers and frames of the assembly.

FIG. 1 shows the various support frames and cover plates. The first component that is attached to the wall is the back plate 1. This is a simple lightweight sheet steel component that has intrinsically low strength and stiffness and gets its strength and stiffness from the wall to which it is attached. The illustrated back plate 1 is wide enough to accommodate a combi module as described below. A narrower plate can be used if no combi module is required.

To this is attached the room sealed box 2. This is a sheet metal fabrication and comprises a back section 3 and a front section 4. The panels of the two sections are shaped for stiffness to reduce the risk of resonance at the engine running frequency. The box 2 is lined with a self-adhesive composite sound-damping sheet which damps vibration in the metalwork and absorbs airborne vibration. The front and back section are sealed together by a silicone rubber sealing strip which provides a resilient sealing member which serves to provide an airtight sealed enclosure and which also isolates the exterior of the room sealed box from noise and vibration of the components housed within the room sealed box as described in greater detail below. The back section 3 is hooked onto the bottom of the back plate 1 and secured at the top with a number of bolts.

A cosmetic panel 5 may be fitted on the front section of the room sealed box. Also, if a combi module is provided, a combi housing 6 and combi cosmetic panel 7 are provided alongside the main unit.

As shown in FIG. 1, the back section 3 of the room sealed box is provided with a number of fixtures for various components. In particular, about halfway along its length, the back section 3 is provided with a cantilever engine support bracket 8. This is provided with a large circular aperture 9 and has a down turned flange 10 at either side for additional structural rigidity. A pair of lugs 11 (only one of which is shown in FIG. 1, as the other is obscured behind the front section) project from the front of the engine support bracket 8 for reasons to be described below.

Figure 2:
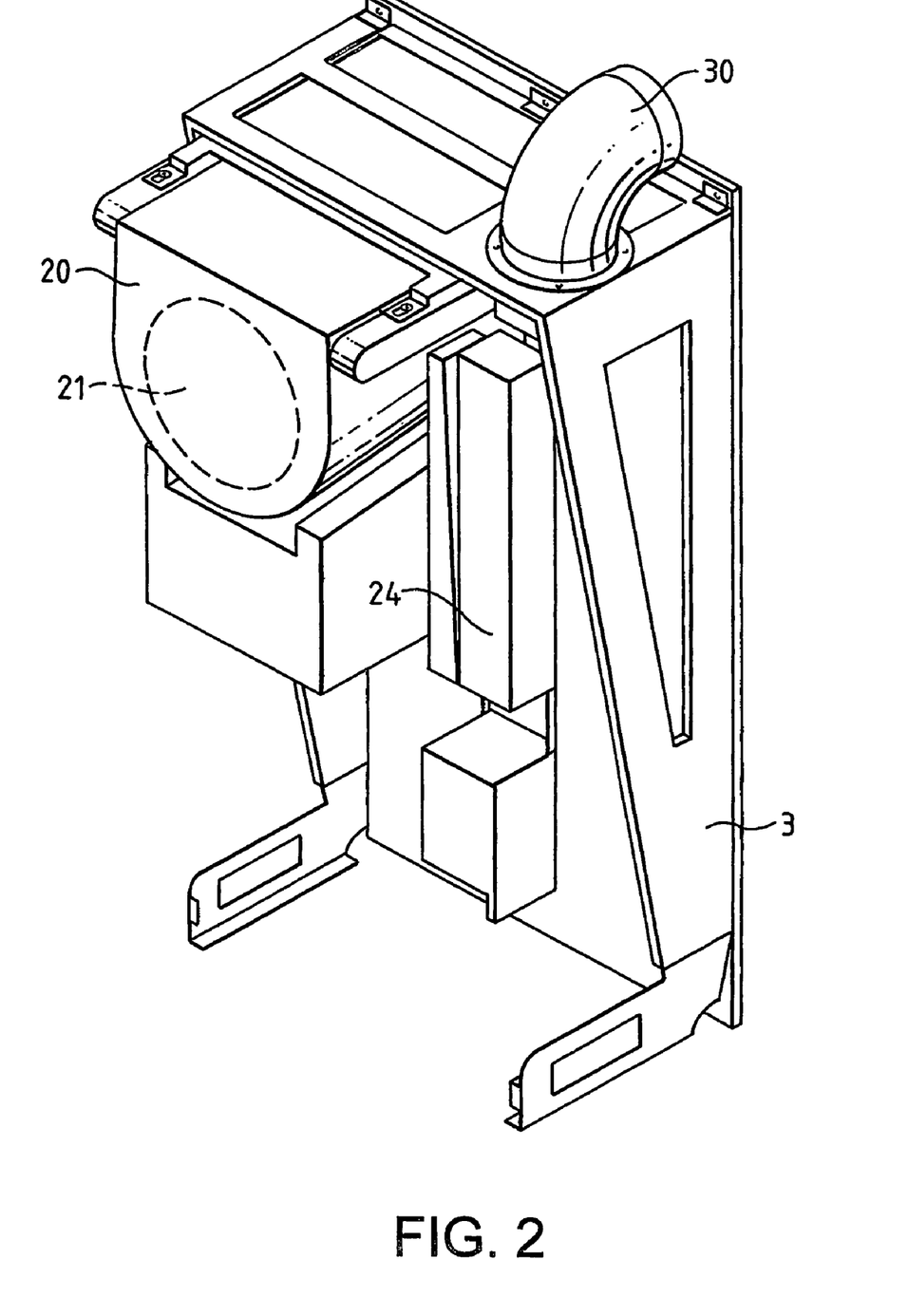
FIG. 2 is a perspective view showing the rear part of the room sealed box with the heat exchanger module and other components in place.

FIG. 2 shows the various additional components supported on the back section 3 of the room sealed box 2. A heat exchanger module 20 is positioned at the top of the back section 3. This comprises a main heat exchanger 21 in which heat is recovered from exhaust gas from a Stirling engine and from a supplementary burner into a hot water stream for use in the domestic central heating. The nature of this heat exchanger is described in more detail in application PCT/GB02/05771. The structure of this heat exchanger is not material to the present invention. Also on the back section 3 is the gas train 24. This essentially comprises the appropriate pipework, fans and valves to provide supplies of air and combustible fuel to an engine burner and supplementary burner (not shown). Details of appropriate gas trains are given in applications PCT/GB02/05775 and PCT/GB02/05776. Ducts (not shown) feed combustible gas-air mixture to the supplementary and engine burners respectively. Also, a concentric exhaust flue 30 for exhaust gases from the burners either extends from the top of the back section 3 or from the back surface, passing through an orifice 31 in the back plate. The flue is then aligned with an orifice in the wall of the dwelling.

The connections required to the heat exchanger module as shown in FIG. 2 are as follows:

Gas inlet to mixer valves to supply the engine burner and supplementary burner via gas train 24.

Air inlet driven by fan (not shown) for engine burner and supplementary burner via gas train 24.

Water inlet for water to the heat exchanger 21.

Hot exhaust gas inlet from Stirling engine.

Control wiring for various electrical components including the valves and fan of the gas train 24.

Flue gas outlet 30 for exhaust gas.

Hot combustion gases provided from the burner (not shown) to the head of the engine.

Water outlet for water which has been heated by the heat exchangers.

The back section 1 together with the components described thus far will be assembled as a single module in the factory and will be fixed as a unit to the back plate 1. With this in place, the Stirling engine module 40 can be put into place. The Stirling engine module 40 is described in more detail with reference to FIGS. 3 and 4.

Figure 3:
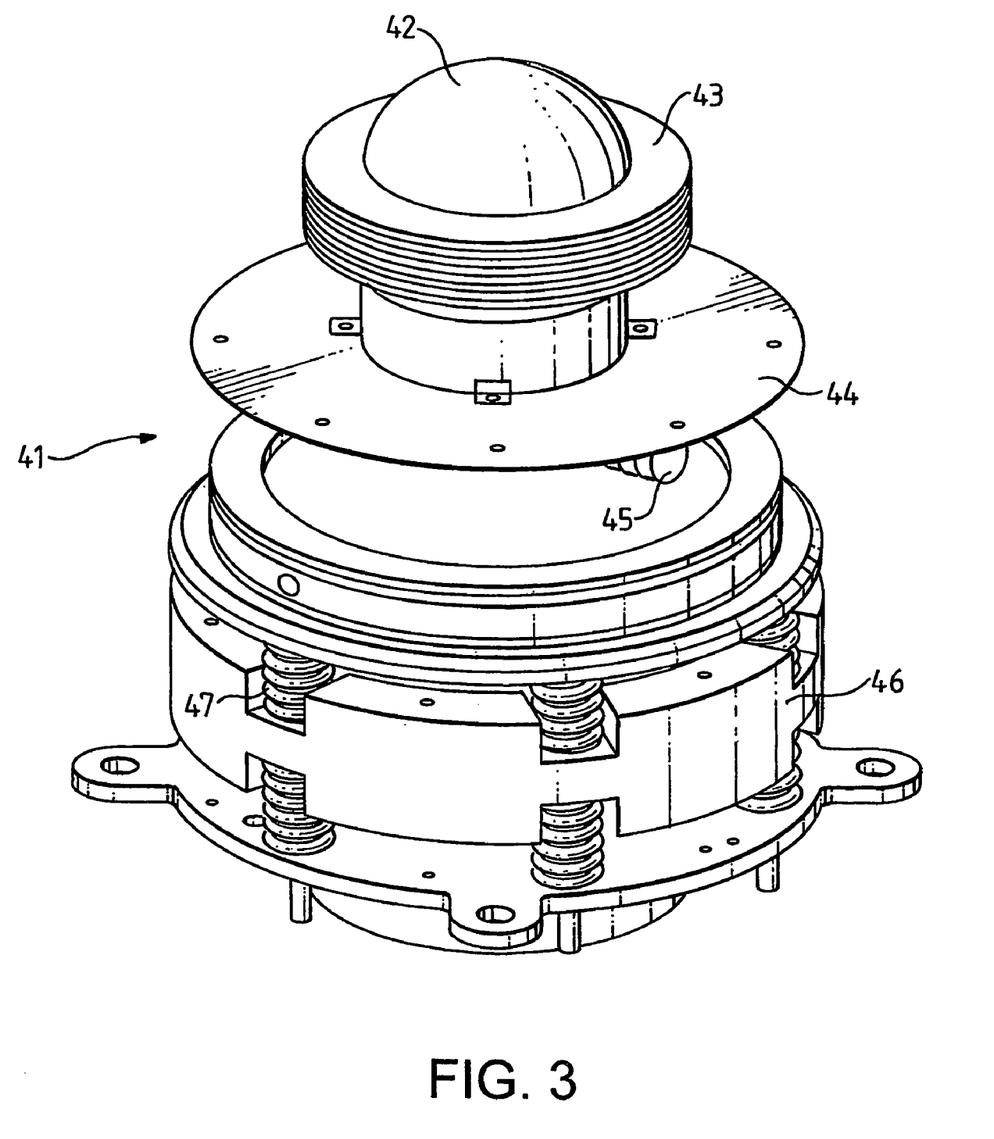
FIG. 3 is a perspective view of a Stirling engine sub-assembly.

The main component of the Stirling engine module is the Stirling engine 41 as shown in FIG. 3. This has an engine head 42 surrounded by a plurality of axially extending fins 43 which are supplied with heat from the engine burner in the heat exchanger module 20. Beneath the head is an annular engine mounting flange 44 the purpose of which will be described subsequently. Beneath the head is the engine cooler (not shown) to which water is supplied along pipe 45. Beneath the cooler is the alternator which converts reciprocal movement of a piston within the engine into electrical energy in a manner well known in the art. The engine is surrounded by an annular absorber mass 46 tuned to 50 Hz which is suspended on a plurality of springs 47 to absorb the natural vibrations of the Stirling engine, as described in greater detail in PCT/GB02/05111.

Figure 4:
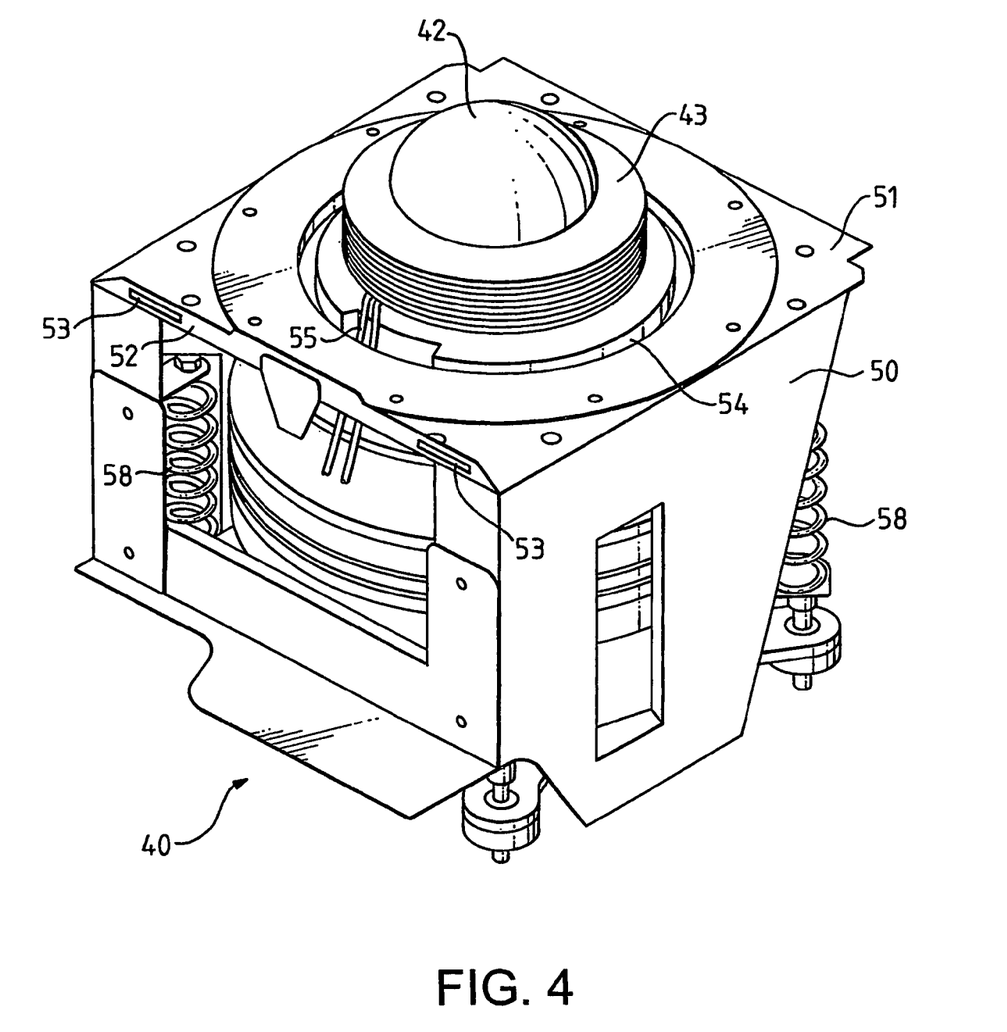
FIG. 4 is a similar perspective view of the Stirling engine module incorporating the Stirling engine sub-assembly of FIG. 3.

The Stirling engine sub-assembly shown in FIG. 3 forms the core of the Stirling engine module 40 as shown in FIG. 4. The module is surrounded by a housing 50, the top surface of which provides an engine hanging bracket 51 by virtue of which the engine is hung from the back section 3 in a manner to be described below. Bracket 51 is an upturned flange 52 with a pair of spaced orifices 53.

Also shown in FIG. 4 is insulation 54 which insulates a combustion seal (not shown) from the hot gases from the burner which impinge on the fins 43. This is described in more detail in our earlier application GB 0211121.9.

Ignitor and ionisation probes 55 are provided to monitor the firing of the engine burner.

A helium fill point (not shown) is provided on the housing 50 to allow the Stirling engine to be pressurised. These can also be used to replenish the gas during maintenance.

The Stirling engine 41 is hung from the frame 50 by a plurality of elongate tensions springs 58 as described in more detail in PCT/GB02/05111. A water pipe (not shown) supplies water to and from the engine cooler via the pipe 45.

The connections to the Stirling engine module 40 are as follows:

Water inlet to cool the engine cooler and also the combustion seal.

Control wiring for the engine control systems.

Water outlet from the engine and the combustion seal.

Power wiring for generated electricity.

Sensor wiring for communication with control systems.

Figure 5A:
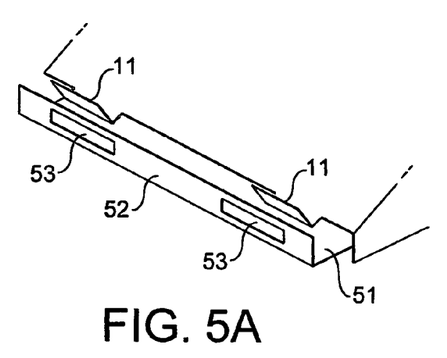
FIGS. 5A, 5B and 5C are schematic sketches showing how the Stirling engine module is swung into position.
Figure 5B:
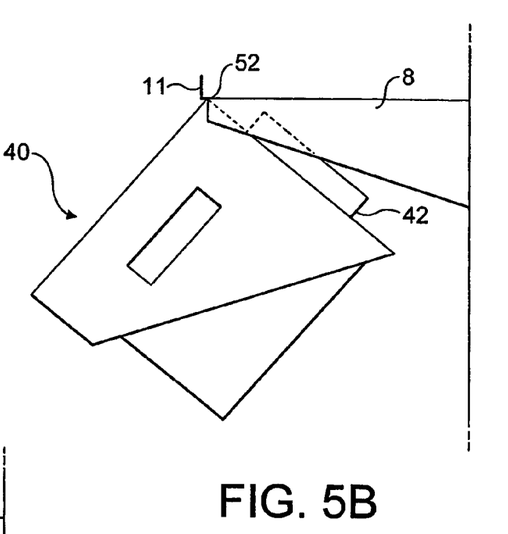
Figure 5C:
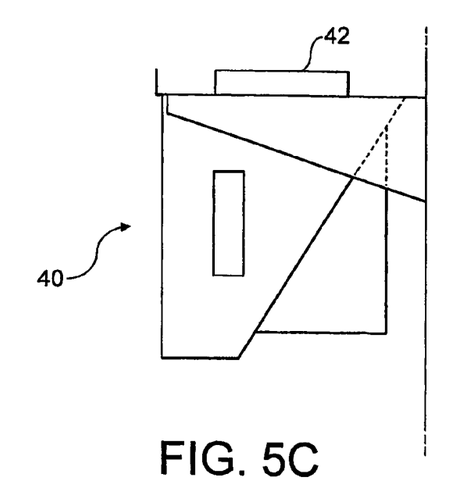

With the back section 3 and heat exchange module 20 in place as shown in FIG. 2, the engine module 40 is mounted as shown in FIGS. 5A-5C. With the module 40 tilted such that the upturned flange 52 is uppermost, the orifices 53 are hooked over the lugs 11 as shown in FIGS. 5A and 5B. Once the module 40 is correctly located, it is then swung into the position shown in FIG. 5C where the engine hanging bracket 51 is secured by screws or other suitable fasteners to the mounting bracket 8 and the joint is sealed by a ceramic paper gasket (not shown). In this position, the fins 43 on the head 42 of the engine 41 are surrounded by the engine burner in the heat exchange module 20.

Figure 6:
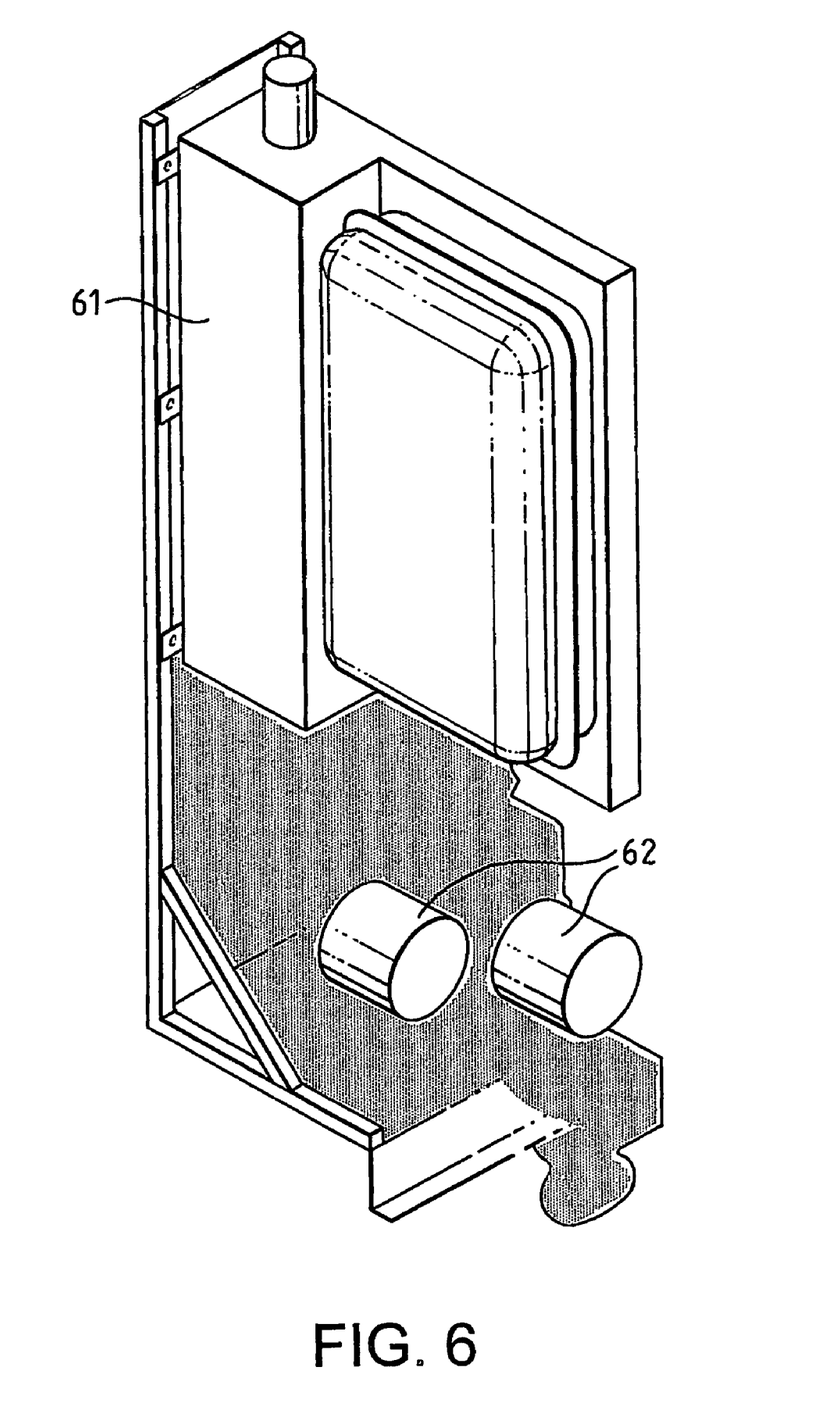
FIG. 6 is a perspective view of the internal components of the combi module.
Figure 7:
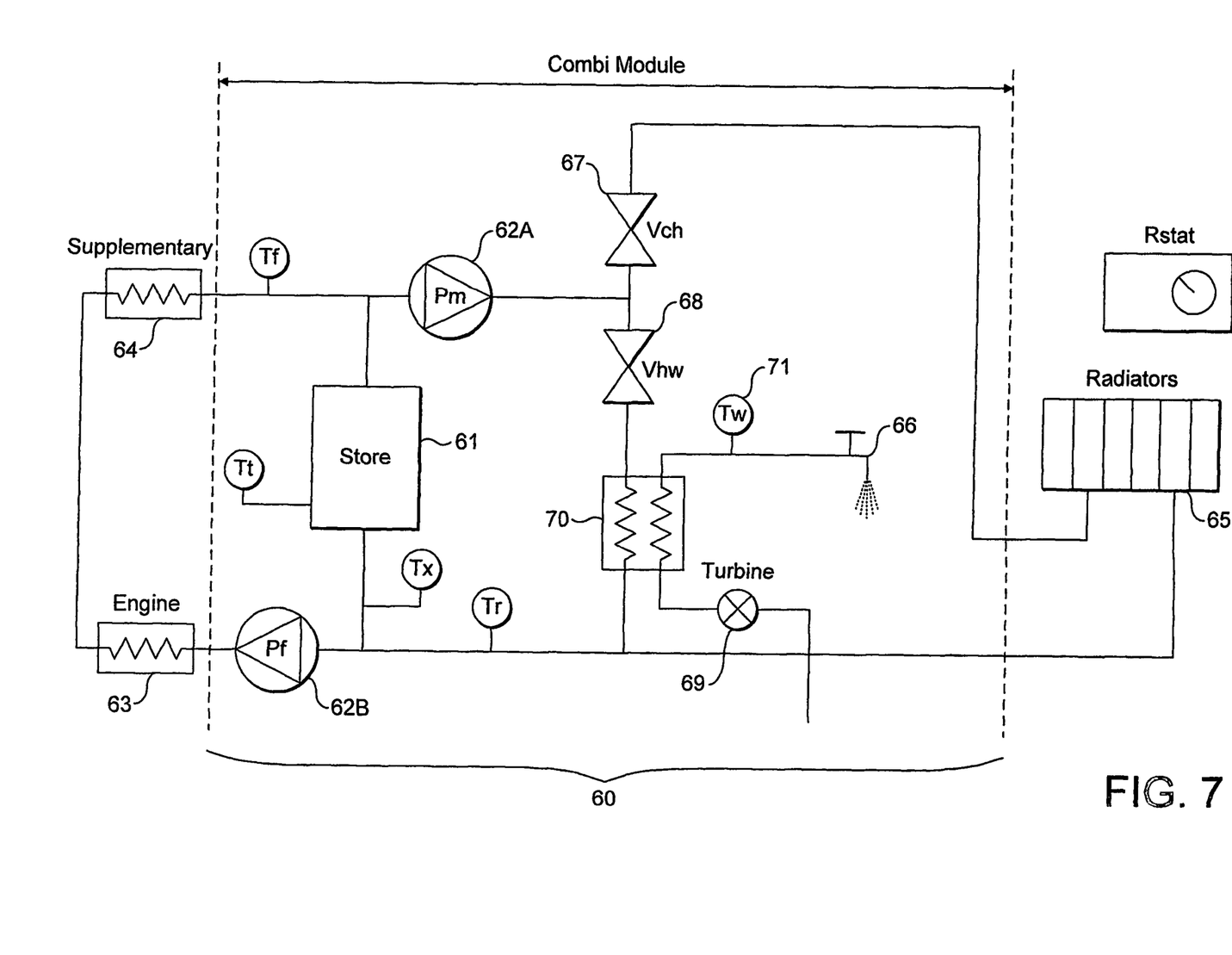
FIG. 7 is a schematic of the components of the combi module.

If the appliance is a combi type, a combi module 60 can be attached, and this is shown in FIGS. 6 and 7. The combi module is provided within the combi housing 6 as shown in FIG. 1.

The combi module 60 is designed to provide a source of hot water allowing almost instantaneous provision of hot water as soon as a tap is turned on in the domestic dwelling. In a conventional combi unit, the burners are simply fired on demand to provide the hot water requirement. However, it is advantageous to be able provide hot water as quickly as possible. This is particularly important when running in summer mode where there is no central heating demand as, without a store of hot water, the burner has to go through its ignition sequence, fire up and heat the thermal mass of water, the heat exchanger and the connecting pipework. In the case of the present dchp appliance, there is the additional thermal mass of the engine water jacket to heat up. The storage tank 61 is part of the hot water and central heating distribution system shown in FIG. 7. Water is pumped around the system by a modulating pump 62A and a fixed speed pump 62B. Under normal operation, water will be pumped around the engine heat exchanger 63 and supplementary heat exchanger 64 to radiators 65 and hot water tap 66 under the control of a central heating valve 67 and hot water valve 68.

The modes of operation of the combi module 60 are as follows:

1. Hot Water Store

When there is a potential requirement for domestic hot water (as set by the programmer) the storage tank 61 (12 liters capacity) is maintained at a temperature at or close to 77□C. If the central heating is on the engine will already be firing and the storage tank 61 can be heated by opening the hot water valve 68 and closing the central heating valve 67 for a short period. If it is outside the programmed central heating period, the storage tank is heated by firing the supplementary burner for a short period.

2. Domestic Hot Water Demand

When a hot tap is turned on anywhere in the house, a turbine flow meter 69 senses the flow.

If the appliance is not already supplying a central heating demand, the modulating pump, 62A is started and the hot water valve 68 is opened. This directs hot water from the storage tank 61 through the plate heat exchanger 70 to rapidly heat the domestic hot water. The control system adjusts the speed of the modulating pump to deliver the required hot water temperature (measured by sensor 71). Meanwhile the ignition sequence for the supplementary burner is initiated and the fixed speed pump 62B is started, so that, by the time the storage tank 61 is depleted, continuing heat for the hot water is supplied by the supplementary burner.

The supplementary burner firing rate and the modulating pump speed are both adjusted by the control system to maintain the delivery temperature of the domestic hot water at the user-defined set point over a flow range of 3 to 15 liters/minute. Domestic hot water supply takes priority over a central heating demand.

3. Central Heating Mode

When there is a demand for central heating and no domestic hot water, central heating valve 67 is open and hot water valve 68 is closed. The control system adjusts the supplementary burner firing rate to maintain the required flow temperature Tf and the appliance operates in the same way as it would with no combi module 60.

Connections to the Combi Module 60 are:

A water inlet from the supplementary heat exchanger 64.
   A water outlet to the engine 41.
   Control wiring to control the valves and pumps.
   An outlet for the domestic hot water.
   A water inlet from the central heating system.
   A water outlet to the central heating system.
   Sensor wiring to convey sensed information to the control system.

Figure 8:
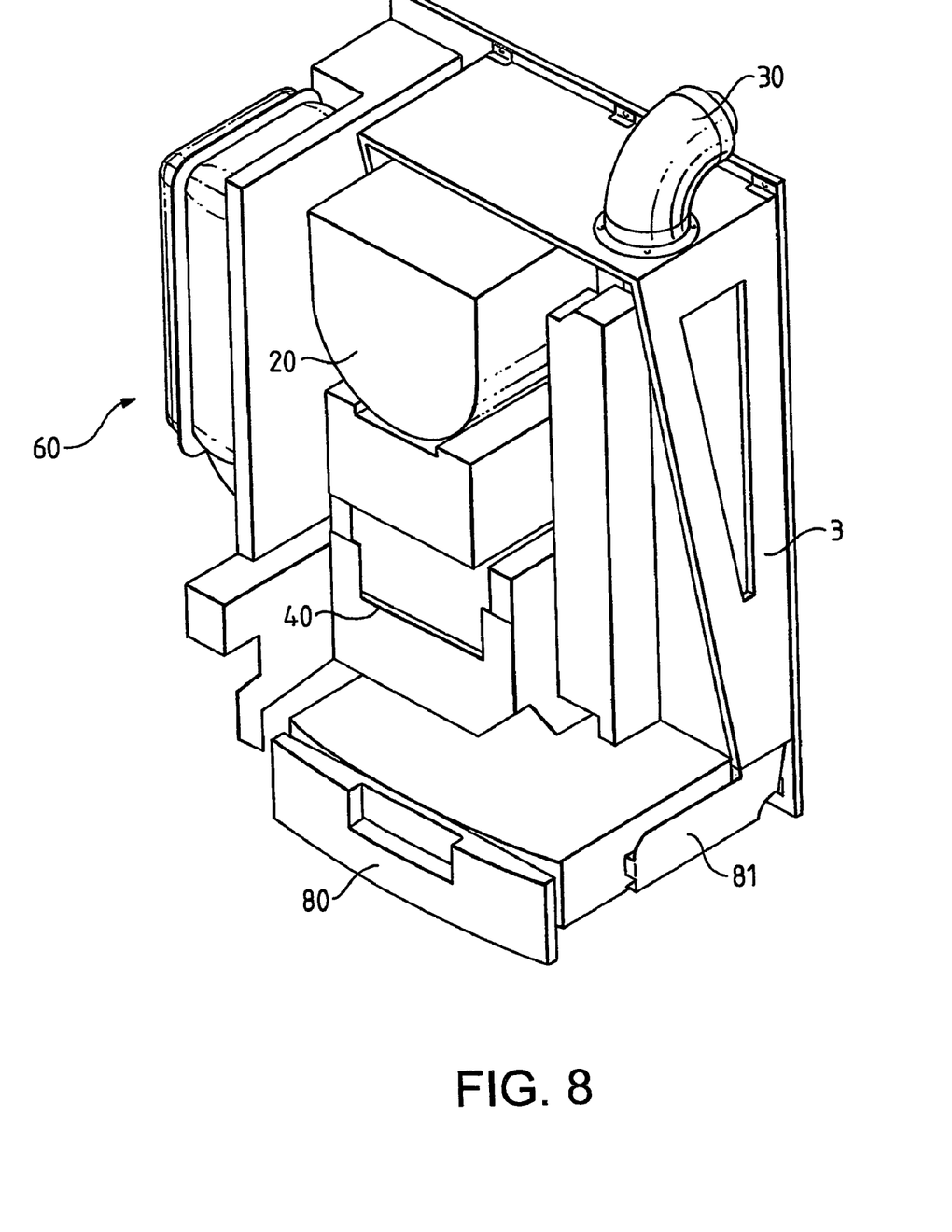
FIG. 8 is a perspective view showing all of the components in place but with the front cover removed.

The final module to be installed is the electronics module 80 which is slid into position along brackets 81 at the bottom of the back section 3 as shown in FIG. 8. The electronics module 80 has the following connections:

An input for sensor wiring from the other modules.
   Power wiring to power the control module.
   User control input allowing the user to interface with the system and set the appropriate heating parameters.
   Control wiring to control the various modules.
   Power wiring to supply electrical power to the home.

Indeed, FIG. 8 shows all of the modules installed in place. All that remains is for the front section 4, the combi housing 6, and the cosmetic panels 5 and 7 (shown in FIG. 1) to be fixed in place to complete the installation.

The invention claimed is:

1. A domestic combined heat and power assembly comprising a wall mountable frame; a Stirling engine module comprising a Stirling engine for the generation of electrical power and which is also arranged to provide heat energy, the engine comprising a head arranged, in use, to be heated; and a heat exchanger module for the recovery of heat from the Stirling engine; wherein the Stirling engine module and the heat exchanger module are separate units, and wherein the Stirling engine module is mountable to the frame independently of the heat exchanger module in a substantially vertical orientation with the engine head uppermost.

2. An assembly according to claim 1, wherein the frame has a bracket arranged to receive the engine in a first position from which it is pivotably moveable about the bracket to a second operating position in which it is permanently supported by the frame.

3. An assembly according to claim 1, wherein the Stirling engine module comprises one or more of a resiliently mounted absorber mass, a combustion seal, the engine suspension assembly, and pipes for the supply of water to and from an engine cooler.

4. An assembly according to claim 1, wherein the heat exchanger module comprises one or more of a burner for the supply of hot combustion gases to the Stirling engine head, a supplementary burner for the generation of additional heat, a gas train for the supply of combustible gas to the or each burner, an exhaust duct for the removal of exhaust gases from the or each burner, and water pipes for water to be heated by the or each burner.

5. An assembly according to claim 1, further comprising a control module comprising a system controller and which is mountable to the frame independently of the Stirling engine and heat exchanger modules.

6. An assembly according to claim 1, further comprising a combi module which is mountable to the assembly independently of any other modules and which is arranged to supply a domestic demand for hot water.

7. An assembly according to claim 6, wherein the combi module comprises a hot water tank, and the assembly further comprises control means to maintain the temperature of the water in the tank at an elevated temperature at times of likely hot water demand.

8. A domestic combined heat and power unit comprising a sealed housing, means for mounting the sealed housing to a wall; a Stirling engine; a burner for heating the head of the Stirling engine; and a heat exchanger for recovering exhaust heat from the head of the Stirling engine, wherein the Stirling engine, burner and heat exchanger are supported directly by the sealed housing.

* * * * *

UNITED STATES PATENT AND TRADEMARK OFFICE
CERTIFICATE OF CORRECTION

PATENT NO. : 7,650,750 B2 Page 1 of 1
APPLICATION NO. : 10/556412
DATED : January 26, 2010
INVENTOR(S) : Johnston et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

Signed and Sealed this

Twenty-eighth Day of December, 2010

David J. Kappos
*Director of the United States Patent and Trademark Office*